(12) United States Patent
Tanabe et al.

(10) Patent No.: US 8,128,528 B2
(45) Date of Patent: Mar. 6, 2012

(54) PLANETARY GEAR SET AND METHOD FOR PRODUCING THE SAME

(75) Inventors: Kenji Tanabe, Toyota (JP); Yota Mizuno, Toyota (JP); Hiroshi Hata, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1122 days.

(21) Appl. No.: 11/666,418

(22) PCT Filed: Dec. 20, 2005

(86) PCT No.: PCT/IB2005/003844
§ 371 (c)(1),
(2), (4) Date: Apr. 27, 2007

(87) PCT Pub. No.: WO2006/070245
PCT Pub. Date: Jul. 6, 2006

(65) Prior Publication Data
US 2008/0300097 A1    Dec. 4, 2008

(30) Foreign Application Priority Data
Dec. 28, 2004    (JP) .................................. 2004-379910

(51) Int. Cl.
*F16H 57/08*    (2006.01)

(52) U.S. Cl. ........................ 475/331; 475/344; 29/893.2

(58) Field of Classification Search ................... 475/331, 475/344; 29/893.2, 893.1
See application file for complete search history.

(56) References Cited

U.S. PATENT DOCUMENTS

| | | | | |
|---|---|---|---|---|
| 5,605,518 A | * | 2/1997 | Kogure et al. | ................ 475/344 |
| 6,112,611 A | | 9/2000 | Maki | |
| 6,481,553 B1 | | 11/2002 | Lee | |
| 2006/0148611 A1 | * | 7/2006 | Neudecker et al. | ........... 475/331 |

FOREIGN PATENT DOCUMENTS

| | | |
|---|---|---|
| DE | 103 09 666 A1 | 12/2004 |
| EP | 1 094 249 A2 | 4/2001 |
| GB | 2 232 454 A | 12/1990 |
| JP | A 2-278044 | 11/1990 |
| JP | A-4-334759 | 11/1992 |
| JP | U-5-45311 | 6/1993 |
| JP | A 9-32891 | 2/1997 |
| JP | A-2001-165280 | 6/2001 |
| JP | A-2002-525538 | 8/2002 |
| WO | WO 00/19128 A1 | 4/2000 |
| WO | WO 2004/055410 A1 | 7/2004 |

OTHER PUBLICATIONS

Japanese Office Action issued in Japanese Patent Application No. 2004-379910 on Apr. 6, 2010 (with partial translation).

* cited by examiner

*Primary Examiner* — David D Le
*Assistant Examiner* — Derek D Knight
(74) *Attorney, Agent, or Firm* — Oliff & Berridge, PLC

(57) ABSTRACT

A planetary gear set includes a sun gear; pinions that are positioned around the sun gear and that mesh with the sun gear; and a ring gear that is positioned on the outer side of the pinions and that meshes with the pinions. Each pinion has a plurality of teeth on the outer surface thereof. Each tooth has a first tooth surface and a second tooth surface on opposite sides of the tooth, which can contact tooth surfaces of the sun gear and the ring gear. The deviation of the first tooth surface from the corresponding reference surface differs from the deviation of the second tooth surface from the corresponding reference surface.

6 Claims, 8 Drawing Sheets

PLANETARY GEAR SET AND METHOD FOR PRODUCING THE SAME

BACKGROUND OF THE INVENTION

The disclosure of Japanese Patent Application No. 2004-379910 filed on Dec. 28, 2004, including the specification, drawings and abstract is incorporated herein by reference in its entirety.

1. Field of the Invention

The invention relates generally to a planetary gear set and a method for producing the same, and, more specifically, to such planetary gear set mounted in a vehicle and a method for producing the same.

2. Description of the Related Art

A conventional type of planetary gear set and a method for producing the same are described in, for example, Japanese Patent Application Publication No. JP-A-02-278044 and Japanese Patent Application Publication No. JP-A-09-32891.

Japanese Patent Application Publication No. JP-A-02-278044 describes a pinion where the center of gravity does not coincide with the center point. Japanese Patent Application Publication No. JP-A-09-32891 describes a method for assembling a Ravigneaux type planetary gear set where a pinion is placed in the appropriate orientation by using a convex portion of a carrier and marking applied on the pinion.

However, even with the technology described in either of the above-mentioned publications, the features required during acceleration and the features required during deceleration cannot be sufficiently obtained.

SUMMARY OF THE INVENTION

The invention is made to solve the above-mentioned problem. It is, therefore, an object of the invention to provide a planetary gear set which can satisfy the requirements that vary depending on whether the vehicle is accelerating or decelerating, and a method for producing such a planetary gear set.

A first aspect of the invention relates to a planetary gear set including a sun gear; pinions that are positioned around the sun gear and that mesh with the sun gear; and a ring gear that is positioned on the outer side of the pinions and that meshes with the pinions. Each pinion has a plurality of teeth on the outer surface thereof. Each tooth has a first tooth surface and a second tooth surface on opposite sides of the tooth, which can contact the tooth surfaces of the sun gear and the ring gear. The deviation of the first tooth surface from the corresponding reference surface differs from the deviation of the second tooth surface from the corresponding reference surface.

In the thus configured planetary gear set, because the deviation of the first tooth surface from the reference surface differs from the deviation of the second tooth surface from the reference surface, the features for the first tooth surface and the second tooth surface can be set independently of each other. As a result, if the first tooth surface is used as the tooth surface used during one of acceleration and deceleration, and the second tooth surface is used as the tooth surface used during the other of acceleration and deceleration, it is possible to provide the planetary gear set having both the tooth surface corresponding to the features for acceleration and the tooth surface corresponding to the features for deceleration.

In the first aspect, each pinion may have a first face and a second face that are apart from each other at a given distance in the thrust direction to define the length of the pinion, and the distance between the first face of the pinion and the first face of the tooth may be different from the distance between the second face of the pinion and the second face of the tooth. In this case, because the distance between the first face of the pinion and the first face of the tooth differs from the distance between the second face of the pinion and the second face of the tooth, it becomes easier to discriminate between the first face and the second face. Accordingly, the pinion can be accurately fitted to the planetary gear set.

In the first aspect, the tooth of the pinion may be asymmetric in the right-and-left direction, and the planetary gear set may further include reverse-fitting prevention device that prevents the pinion from being fitted to the planetary gear set when reversed left to right. In this case, due to the presence of the reverse-fitting prevention device, the pinion cannot be fitted to the planetary gear set in the reverse orientation.

In the first aspect, the planetary gear set may further include a planetary carrier that supports the pinions, and the reverse-fitting prevention device may include a projection formed in the planetary carrier or the pinion.

In the first aspect, the projection may be formed on the face of the planetary carrier, which faces one of the side surfaces of the tooth of the pinion.

In the first aspect, the projection may be formed on one of the side surfaces of the tooth of the pinion, which faces the face of the planetary carrier.

A second aspect of the invention relates to a method for producing a planetary gear set. The method includes fitting a planetary carrier to a jig; and fitting a pinion, which has a plurality of teeth on the outer surface and in which each tooth has a first tooth surface and a second tooth surface and the deviation of the first tooth surface from the reference surface differs from the deviation of the second tooth surface from the reference surface, to the planetary carrier fitted to the jig. The jig prevents the pinion from being fitted to the planetary carrier when reversed left to right.

According to such a method for producing a planetary gear set, because the jig prevents the pinion from being fitted to the planetary carrier when reversed left to right, the pinion cannot be fitted to the planetary carrier in the reverse orientation.

In the second aspect, whether the pinion is inappropriately fitted to the planetary carrier may be determined based on whether the end of the jig in the axial direction interferes with the side surface of the tooth of the pinion fitted to the planetary carrier.

A third aspect of the invention relates to a method for producing a planetary gear set. The method includes fitting a pinion, which has a plurality of teeth on the outer surface and in which each tooth has a first tooth surface and a second tooth surface and the deviation of the first tooth surface from the reference surface differs from the deviation of the second tooth surface from the reference surface, to a planetary carrier; and determining whether the pinion is fitted to the planetary carrier while being reversed left to right, by measuring the distance between the side surface of the tooth of the pinion fitted to the planetary carrier and the reference surface of the planetary carrier.

According to this method for producing a planetary gear set, because the orientation of the pinion when fitted to the planetary carrier can be determined by measuring the distance between the face of the tooth of the pinion and the reference surface, fitting the pinion to the planetary carrier in the reverse orientation can be prevented.

In the third aspect, the reference surface of the planetary carrier may be the face that is orthogonal to the axis of the planetary carrier and that faces the pinion.

According to the above-mentioned aspects of the invention, it is possible to provide the planetary gear set that can offer the appropriate features depending on whether the vehicle is accelerating or decelerating.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE EXEMPLARY EMBODIMENTS

Figure 1:
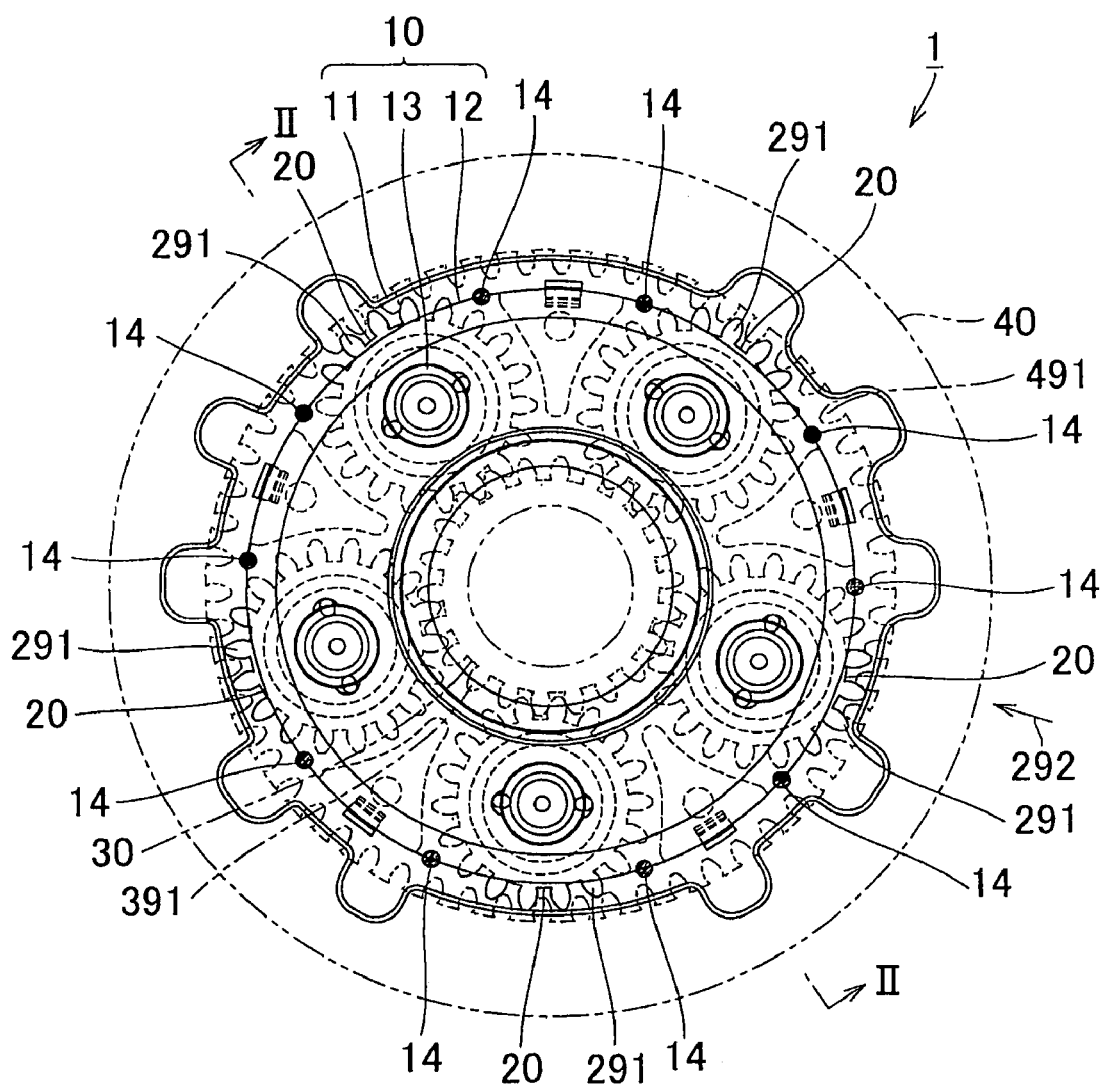
FIG. 1 illustrates the front view of a planetary gear set according to a first embodiment of the invention.

In the following description and accompanying drawings, the invention will be described in more detail in terms of exemplary embodiments. The same or corresponding portions will be denoted by the same reference numerals, and will be described only once.

First, a first embodiment of the invention will be described in detail. FIG. 1 illustrates the front view of a planetary gear set according to the first embodiment. As shown in FIG. 1, a planetary gear set 1 includes a sun gear 30 that is positioned at the center of the planetary gear set; pinions 20 that are provided around the sun gear 30 and that mesh with the sun gear 30; a ring gear 40 that meshes with the pinions 20; and a planetary carrier 10 that supports the pinions 20.

The planetary gear set 1 according to the invention is used as an automatic transmission or a power split mechanism for a hybrid vehicle. When power is input in the ring gear 40, the sun gear 30 is fixed, and the power is output from the planetary carrier 10, the ring gear 40 and the planetary carrier 10 turn in the same direction. When power is input in the planetary carrier 10, the sun gear 30 is fixed, and the power is output from the ring gear 40, the ring gear 40 and the planetary carrier 10 turn in the same direction. When the planetary carrier 10 is fixed, power is input in the sun gear 30, and the power is output from the ring gear 40, the sun gear 30 and the ring gear 40 turn in opposite directions.

As described above, in the planetary gear set 1, one of the ring gear 40, each pinion 20, and the sun gear 30 is fixed, and the power is transferred by the other two components. Each pinion 20 has teeth 291 on the outer surface thereof, and the teeth 291 mesh with teeth 491 of the ring gear 40 and teeth 391 of the sun gear 30. The pinions 20 are supported by the planetary carrier 10. The planetary carrier 10 includes a first carrier 11, a second carrier 12, and a shaft 13. Projections 14 are formed in the first carrier 11 to prevent the pinions 20 from being fitted to the planetary carrier 10 in the reverse orientation.

The pinion 20 is placed in the planetary carrier 10 by being slid in the direction shown by an arrow 292, while the planetary carrier 10 is fitted to the planetary gear set 1. The pinion 20 placed in the planetary carrier 10 is positioned by the pin-shaped shaft 13, and rotatably supported by the planetary carrier 10.

Figure 2:
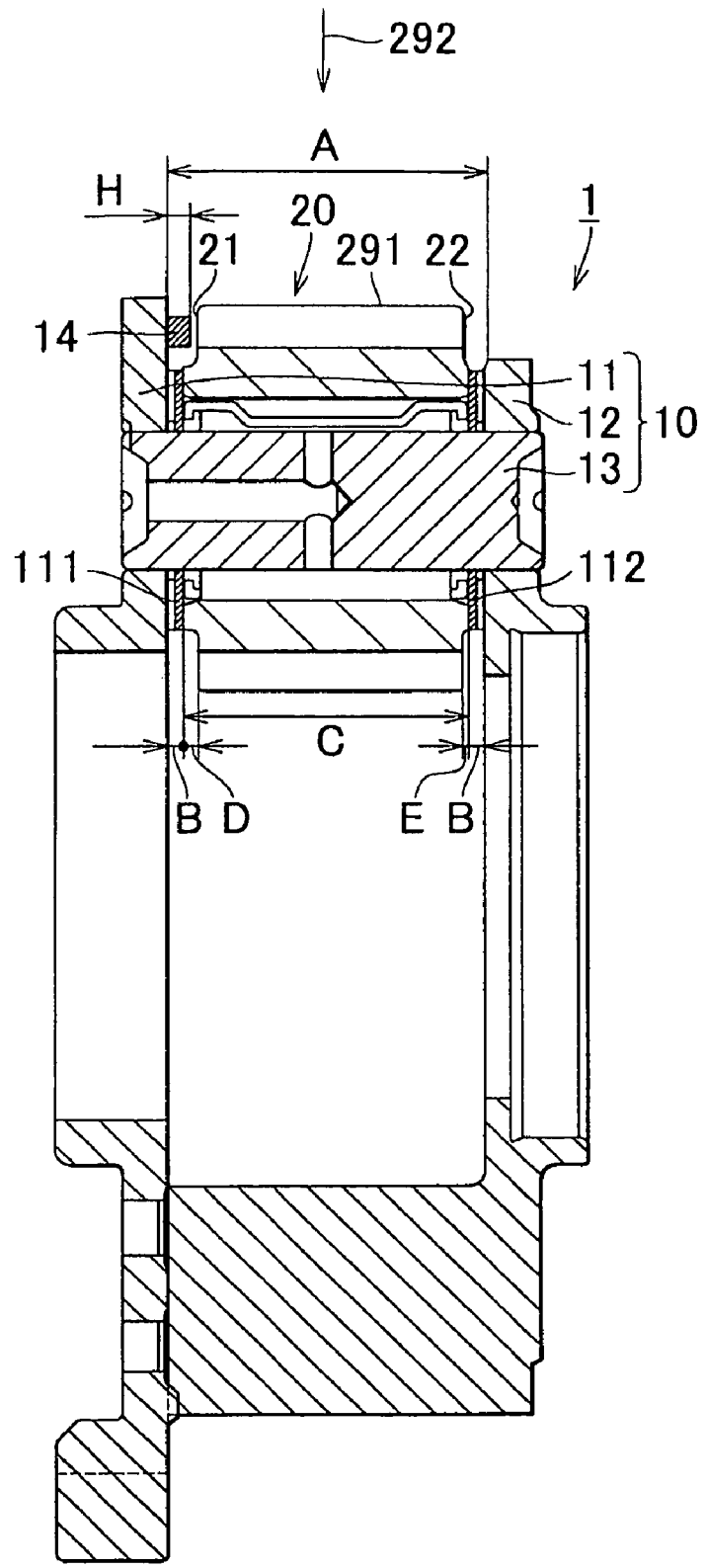
FIG. 2 illustrates the cross sectional view taken along line II-II in FIG. 1.

FIG. 2 illustrates the cross sectional view taken along line II-II in FIG. 1. As shown in FIG. 2, the planetary carrier 10 includes the disc-shaped first carrier 11, the disc-shaped second carrier 12, and the shaft 13 that connects the first carrier 11 to the second carrier 12. The pinion 20 is rotatably supported by the shaft 13. A washer 111 is provided between the pinion 20 and the first carrier 11, and a washer 112 is provided between the pinion 20 and the second carrier 12.

The teeth 291 are provided on the outer surface of each pinion 20. The tooth 291 may be formed of either of a spiral gear or a spur gear. The tooth 291 of the pinion 20 has a first face 21 and a second face 22. The first face 21 and the second face 22 are different in shape. The first face 21 is closer to the projection 14 than the second face 22 is, and is formed so as not to interfere with the projection 14.

In contrast, the second face 22 is further from the projection 14 than the first face 21 is. If the pinion 20 in the reverse orientation (i.e., reversed left to right) is placed in the planetary carrier 10 in the direction shown by the arrow 292, the projection 14 interferes with the second face 22. With this configuration, the pinion 20 cannot be fitted to the planetary carrier 10 when reversed left to right. The distance between the end of the projection 14 and the second carrier 12, that is, the window width of the carrier is "A"; the thickness of each of the washers 111 and 112 is "B", and the width of the pinion 20 is "C". Each of "A", "B", and "C" can be changed as required.

FIG. 1 shows the structure where five pinions 20 are provided. However, the number of the pinions 20 is not limited to five. Any number of pinions 20 may be provided as appropriate. Also, double pinions may be used for the pinions 20.

Figure 3:
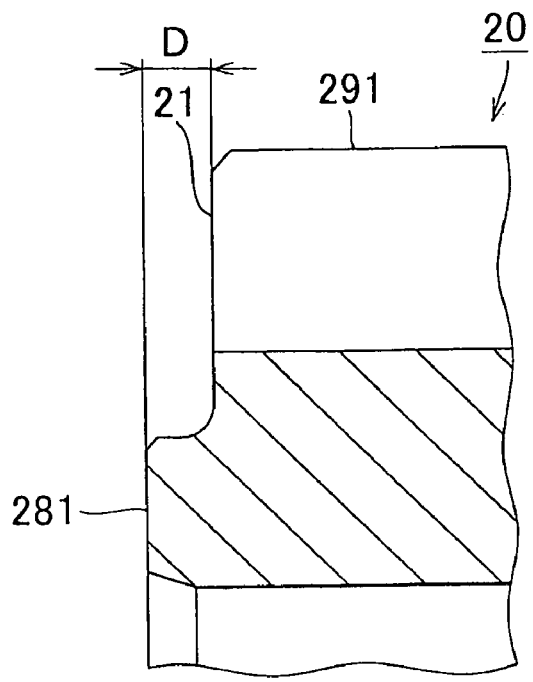
FIG. 3 illustrates the enlarged cross sectional view of a first face in FIG. 2.
Figure 4:
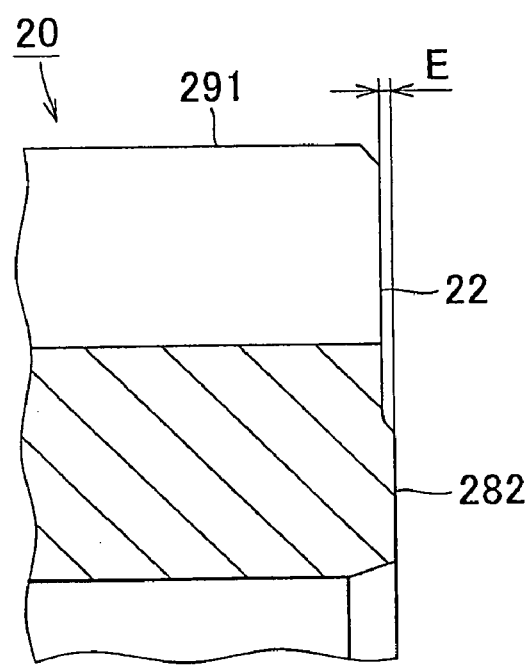
FIG. 4 illustrates the enlarged cross sectional view of a second face in FIG. 2.

FIG. 3 illustrates the enlarged cross sectional view of the first face 21 in FIG. 2. FIG. 4 illustrates the enlarged cross sectional view of the second face 22 in FIG. 2. As shown in FIG. 3, the first face 21 of the tooth 291 is the thrust surface of the pinion 20. The distance between a first face 281 of the pinion 20 and the first face 21 of the tooth 291 is "D", namely, the length of the step formed in the left face of the pinion 20 is "D".

As shown in FIG. 4, the second face 22 in the rear side of the tooth 291 is the thrust surface, and the shape of the second face 22 differs from the shape of the first face 21. The distance between a face 282 of the pinion 20 and the second face 22 of the tooth 291 is "E".

The height of the projection 14 is "H". The relationship among "A" to "E" and "H" can be expressed as follows;

$$A-B-C+E<H<A-B-C+D$$

The projection 14 is formed at a position at which the projection 14 does not interfere with the pinion 20 when the pinion 20 turns.

Figure 5:
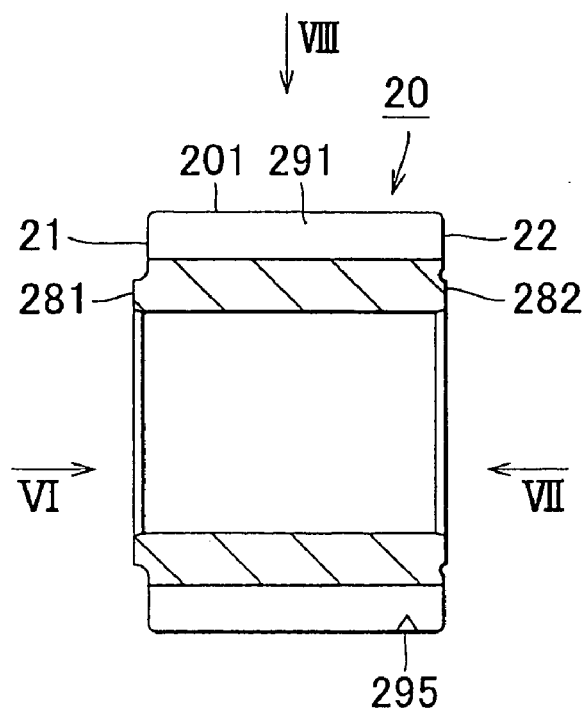
FIG. 5 illustrates the cross sectional view of a pinion.
Figure 6:
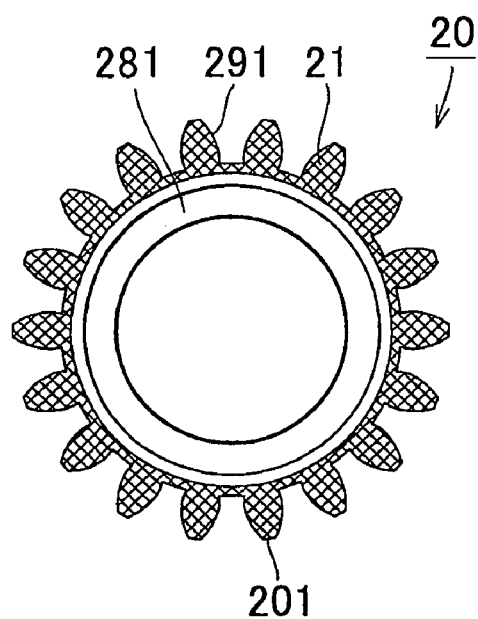
FIG. 6 illustrates the front view of the pinion viewed in the direction shown by the arrow VI in FIG. 5.
Figure 7:
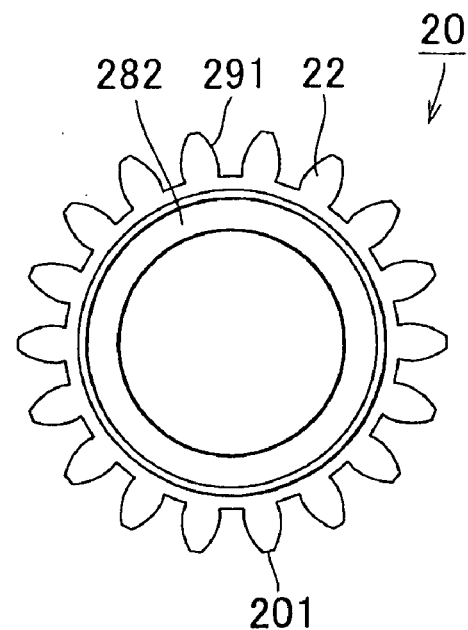
FIG. 7 illustrates the rear view of the pinion viewed in the direction shown by the arrow VII in FIG. 5.

FIG. 5 illustrates the cross sectional view of the pinion 20. FIG. 6 illustrates the front view of the pinion 20 viewed in the direction shown by the arrow VI in FIG. 5. FIG. 7 illustrates the rear view of the pinion 20 viewed in the direction shown by the arrow VII in FIG. 5. Referring to FIGS. 5 to 7, the first face 21 may be painted as shown in FIG. 6 such that the worker can easily discriminate between the right side and the left side of the pinion 20. The hatched portion in FIG. 6 depicts the painted portion.

As shown in FIG. 5, in the cylindrical pinion 20, the step formed on the first face 21 side and the step formed on the second face 22 side are of different shapes. Generally, such differences in shape enable the worker to make a discrimination between the right side and the left side of the pinion 20. However, the worker sometimes makes an erroneous discrimination. To prevent such an erroneous discrimination, the first face 21 may be painted. As shown in FIG. 7, the second face 22 is not painted. In addition, a groove 295 may be formed in the tooth 291. Thus, a discrimination between the right side and the left side of the pinion 20 can be easily made by touching the tooth 291. It is preferable to form the groove 295 in the end portion of the tooth 291.

Figure 8:
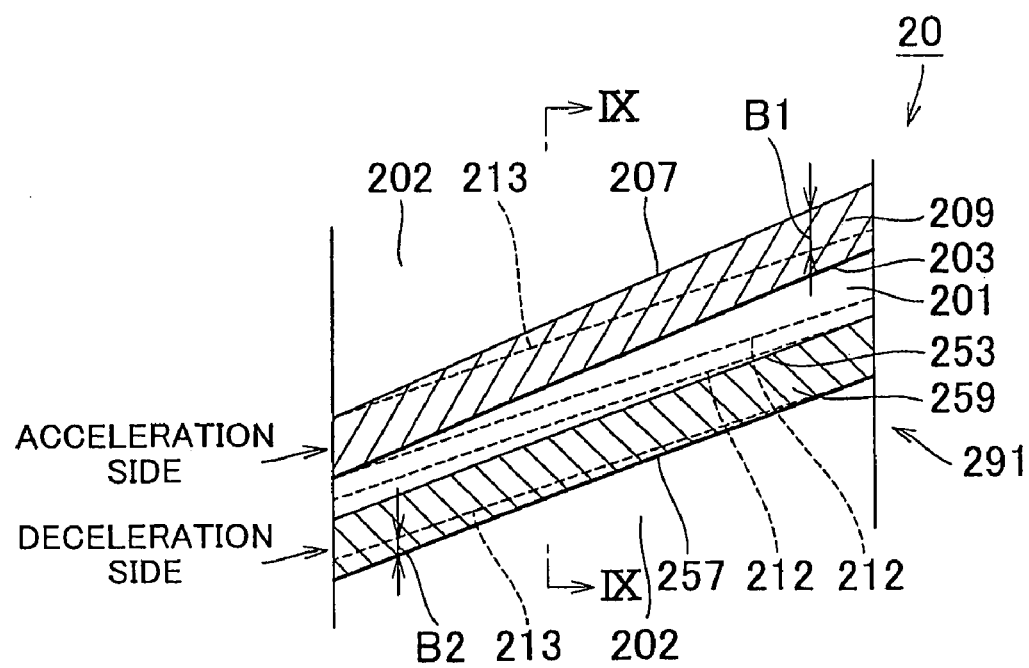
FIG. 8 illustrates the plan view of the pinion viewed in the direction shown by the arrow VIII in FIG. 5.

FIG. 8 illustrates the plan view of the tooth 291 viewed in the direction shown by the arrow VII in FIG. 5. As shown in FIG. 8, one tooth 291 has a tooth top surface 201. The tooth top surface 201 is sandwiched by an acceleration side tooth top line 203 and a deceleration side tooth top line 253. Namely, the region defined by the acceleration side tooth top line 203 and the deceleration side tooth top line 253 is the tooth top surface 201. The acceleration side tooth top line 203 and the deceleration side tooth top line 253 both deviate from respective reference tooth top lines 212. The deviation on the acceleration side differs from the deviation on the deceleration side.

The "acceleration side" is the side where the tooth surface of the pinion 20 contacts the tooth surface of the ring gear 40 or the sun gear 30 while the vehicle is accelerating. The "deceleration side" is the side where the tooth surface of the pinion 20 contacts the tooth surface of the ring gear 40 or the sun gear 30 while the vehicle is decelerating. An acceleration side tooth surface 209 is positioned adjacent to the acceleration side tooth top line 203. The deceleration side tooth surface 259 is positioned adjacent to the deceleration side tooth top line 253. The boundary between the acceleration side tooth surface 209 and a tooth bottom surface 202 is an acceleration side tooth trace 207. The boundary between the deceleration side tooth surface 259 and the tooth bottom surface 202 is a deceleration side tooth trace 257. The acceleration side tooth trace 207 and the deceleration side tooth trace 257 both deviate from respective reference tooth traces 213. The deviation of the acceleration side tooth trace 207 from the reference tooth trace 213 is "B1". The deviation of the deceleration side tooth trace 257 from the reference tooth trace 213 is "B2". Namely, the correction amount is "B1" on the side of the acceleration side tooth trace 207, and the correction amount is "B2" on the side of the deceleration side tooth trace 257. The tooth 291 is in the form of an involute gear. The reference tooth top line 212 and the reference tooth trace 213 correspond to the tooth top line and tooth trace of the involute gear, respectively. In contrast to this, according to the invention, the tooth top line and the tooth trace both deviate from the respective reference lines on both of the acceleration side and the deceleration side. The deviation is different between the acceleration side and the deceleration side.

Figure 9:
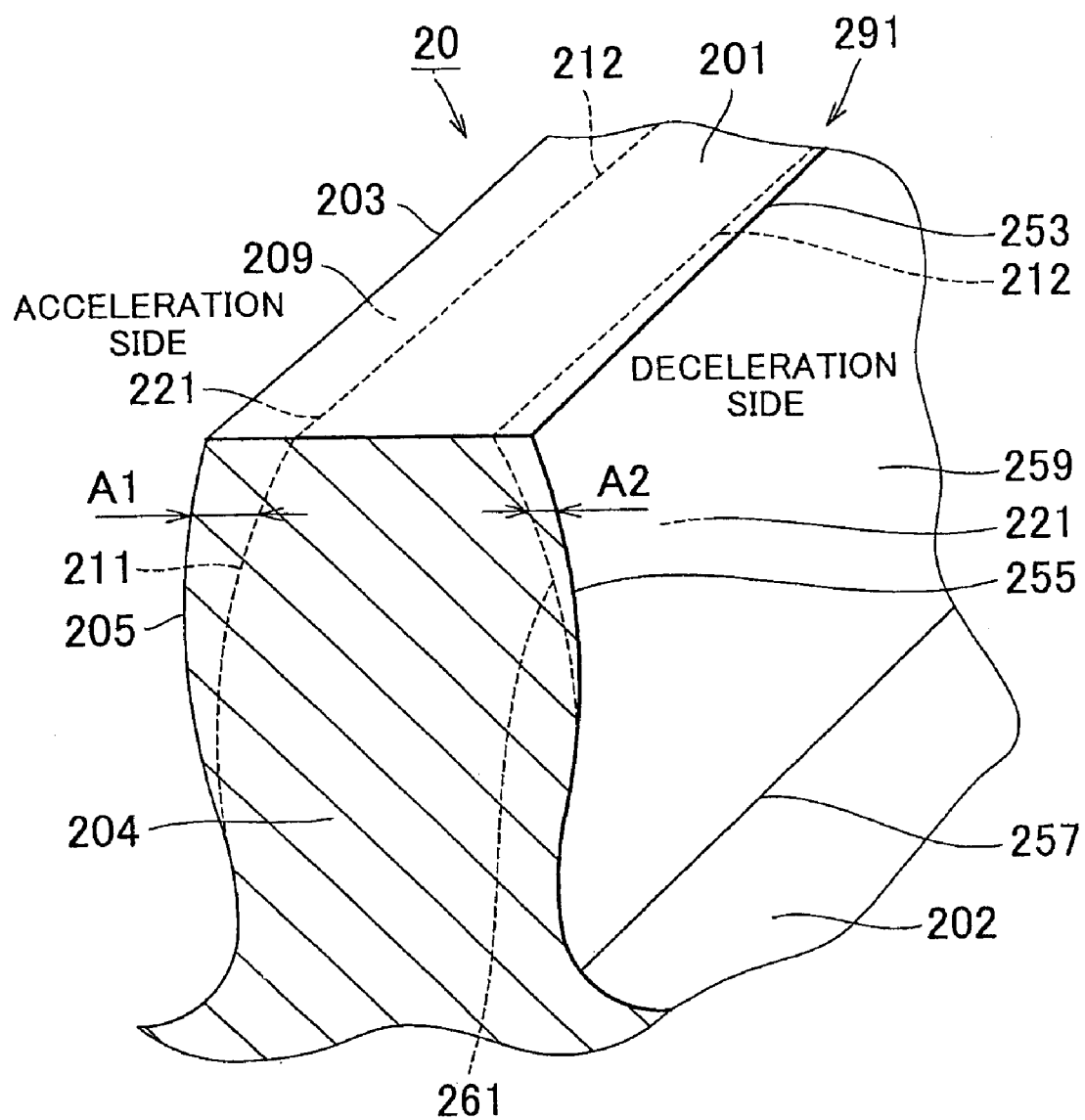
FIG. 9 illustrates the perspective view including the cross section taken along line IX-IX in FIG. 8.

FIG. 9 illustrates the perspective view including the cross sectional view taken along line IX-IX in FIG. 8. The hatched portion in FIG. 9 corresponds to the cross section taken along line IX-IX in FIG. 8. As shown in FIG. 9, in the tooth 291 according to the first embodiment, the tooth profile deviates from the reference tooth profile. More specifically, the deviation of an acceleration side tooth profile 205 from a reference tooth profile 211 is "A1", and the deviation of a deceleration side tooth profile 255 from the reference tooth profile 211 is "A2".

The deviation "A1" corresponds to the correction amount of the tooth profile on the acceleration side, and the deviation "A2" corresponds to the correction amount of the tooth profile on the deceleration side. The reference tooth profile 211 exhibits the involute curve. Each of the acceleration side tooth profile 205 and the deceleration side tooth profile 255, that are the actual tooth profiles, deviates from the reference tooth profile 211 by a predetermined amount. The deviation differs between the acceleration side and the deceleration side. The required features of the tooth profile differ between the acceleration side and the deceleration side. To sufficiently obtain both the features required on the acceleration side and the features required on the deceleration side, the tooth profile and the tooth trace are differentiated between the acceleration side and the deceleration side.

As shown in FIG. 2, if the pinion 20 is fitted to the planetary carrier 10 in the reverse orientation, namely, if the pinion 20 is fitted to the planetary carrier 10 with the acceleration side and the deceleration side of the pinion 20 reversed, a part of the pinion 20 (the second face 22) interferes with the projection 14. Accordingly, as shown in FIGS. 1 and 2, when the pinion 20 is placed in the planetary carrier 10 by being slid in the direction shown by the arrow 292, the projection 14 interferes with the pinion 20, and, therefore, the pinion 20 cannot be placed in the planetary carrier 10. As a result, the pinion 20 cannot be fitted to the planetary carrier 10.

As described so far, the planetary gear set 1 according to the first embodiment includes the sun gear 30, the pinions 20 that are provided around the sun gear 30 and that mesh with the sun gear 30, and the ring gear 40 that is positioned on the outer side of the pinions 20 and that meshes with the pinions 20. Each pinion 20 has a plurality of teeth 291 on the outer surface thereof. Each tooth 291 has the acceleration side tooth surface 209, as the first tooth surface, and the deceleration side tooth surface 259, as the second tooth surface, on opposite sides of the tooth 291, which can contact the tooth surfaces of the sun gear 30 and the ring gear 40. The deviation of the acceleration side tooth surface 209 from a reference surface 221 (involute tooth surface) differs from the deviation of the deceleration side tooth surface 259 from the reference surface 221 (involute tooth surface). The deviation appears as the deviation of the tooth profile from the reference tooth profile and the deviation of the tooth trace from the reference tooth trace. The deviation "A1" of the tooth profile from the reference tooth profile differs from the deviation "A2" of the tooth profile from the reference tooth profile. Also, the deviation "B1" of the tooth trace from the reference tooth trace differs from the deviation "B2" of the tooth trace from the reference tooth trace.

As shown in FIGS. 3 and 4, the pinion 20 has the first face 281 and the second face 282 in the thrust direction. The distance "D" between the first face 281 of the pinion 20 and the first face 21 of the tooth 291 differs from the distance "E" between the second face 282 of the pinion 20 and the second face 22 of the tooth 291.

As shown in FIG. 8, the tooth 291 of the pinion 20 is asymmetric in the right-and-left direction. The projection 14, which serves as reverse-fitting prevention means for preventing the pinion 20 from being fitted to the planetary gear set 1 when reversed left to right, is further provided. The planetary carrier 10 that supports the pinions 20 is further provided, and the projection 14 is formed in the planetary carrier 10 or the pinion 20.

Next, a method for producing the planetary gear set 1 according to the invention will be described in detail. The method is for producing a planetary gear set 1 that includes the sun gear 30; the pinions 20 that are positioned around the sun gear 30 and that mesh with the sun gear 30; the ring gear 40 that is positioned on the outer side of the pinions 20 and that meshes with the pinions 20; and the planetary carrier 10 that supports the pinions 20. Each pinion 20 has a plurality of teeth 291 on the outer surface thereof, and each tooth 291 has the acceleration side tooth surface 209, as the first tooth surface, and the deceleration side tooth surface 259, as the second tooth surface, on opposite sides of the tooth 291, which can contact the tooth surfaces of the sun gear 30 and the ring gear 40. The deviation of acceleration side tooth surface 209 from the reference surface 221 differs from the deviation of the deceleration side tooth surface 259 from the reference surface 221.

In such a planetary gear set 1, the tooth profile of the pinion 20 varies between the acceleration side and the deceleration side, and length of the step formed between the first face 281 and the first face 21 of the tooth 291 differs from the length of the step formed between the second face 282 and the second face 22 of the tooth 291. Due to such a structure, the pinion 20 cannot be fitted to the planetary carrier 10 when reversed left to right. More specifically, the projection 14 is formed in the planetary carrier 10 to prevent erroneous fitting. It is, therefore, possible to provide the planetary gear set 1 that can reliably exhibit the features required for acceleration and the features required for deceleration.

Figure 10:
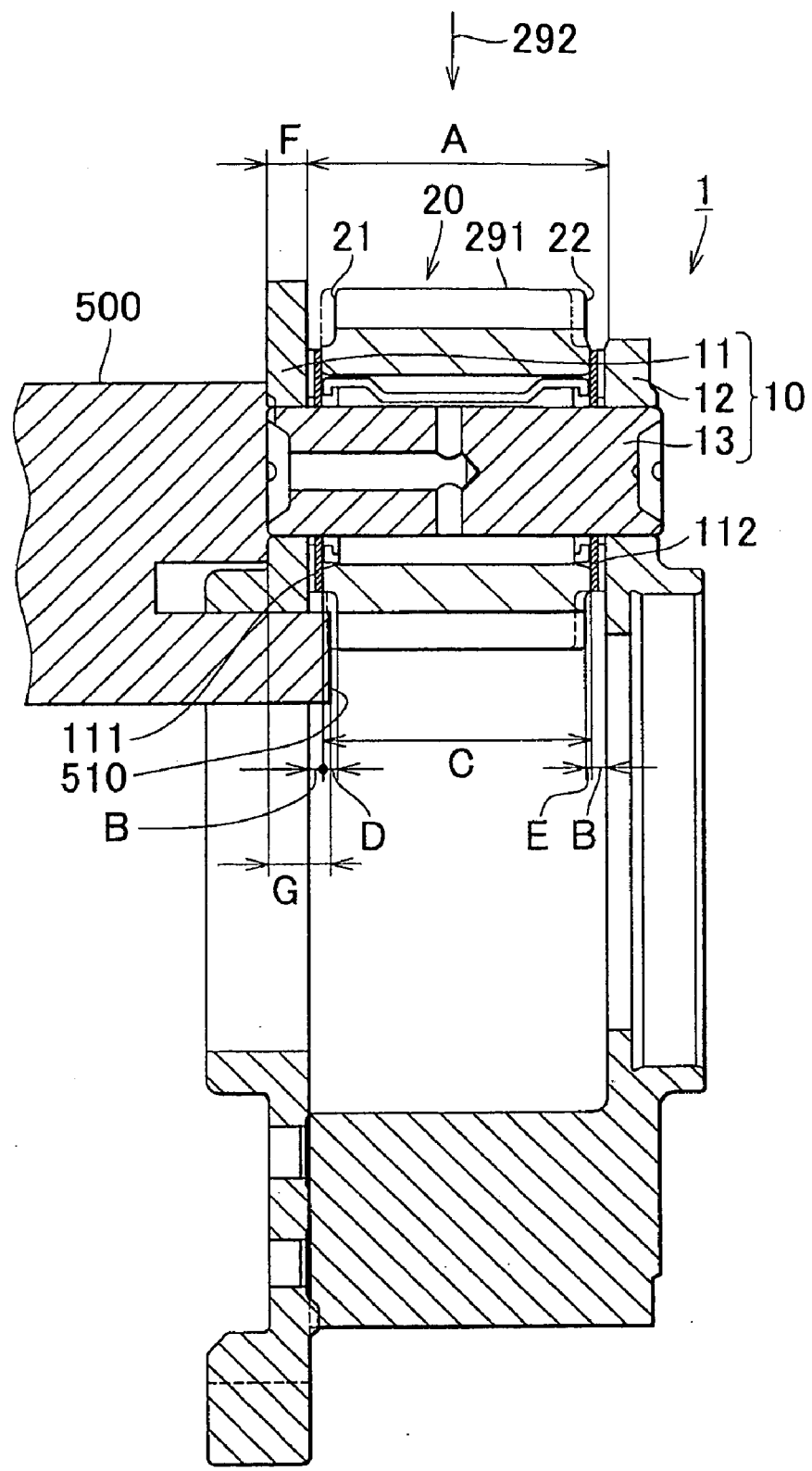
FIG. 10 illustrates the cross sectional view for describing a method for producing a planetary gear set according to a second embodiment of the invention.

Next, a second embodiment of the invention will be described in detail. FIG. 10 illustrates the cross sectional view for describing the method for producing a planetary gear set according to the second embodiment. As shown in FIG. 10, the planetary gear set 1 according to the second embodiment is configured in the same manner as the planetary gear set 1 according to the first embodiment, and the pinion 20 is fitted to the planetary carrier 10 by using a jig 500. When the pinion 20 is fitted to the planetary carrier 10, the jig 500 is used. A projection portion 510 of the jig 500 protrudes toward the inner side of the planetary carrier 10. As shown in FIG. 10, when the pinion 20 is appropriately fitted to the planetary carrier 10, the projection portion 510 does not interfere with the pinion 20. On the other hand, if the pinion 20 is fitted to the planetary carrier 10 when reversed left to right, a part of the pinion 20 protrudes as shown by the chain line in FIG. 10, and interferes with the projection portion 510. As a result, the pinion 20 cannot be fitted to the planetary carrier 10 when in the reverse orientation.

Namely, according to the method for producing a planetary gear set according to the second embodiment, fitting the pinion 20 to the planetary carrier 10 in the reverse orientation can be prevented, without forming a projection in the planetary carrier 10. The projection is formed on the jig 500 for fixing the planetary carrier 10. Due to the presence of the projection portion 510, fitting the pinion 20 to the planetary carrier 10 in the reverse orientation is prevented. When the thickness of the first carrier 11 is "F", and the length of the projection portion is "G", the following relationship can be obtained;

$$F+A-B-C+E<G<F+A-B-C+D$$

Namely, the method for producing a planetary carrier according to the second embodiment is the method for producing a planetary carrier provided with the same pinion 20 as that in the first embodiment. The method includes fitting the planetary carrier 10 to the jig 500, and then fitting the pinion 20 to the planetary carrier 10. The projection portion 510 of the jig 500 prevents the pinion 20 from being fitted to the planetary carrier 10 when reversed left to right.

According to this method for producing a planetary gear set, because the projection portion 510 of the jig 500 interferes with the pinion 20 if the pinion 20 is fitted to the planetary carrier 10 in the reverse orientation. Accordingly, the pinion 20 cannot be fitted to the planetary carrier 10 when reversed left to right.

Figure 11:
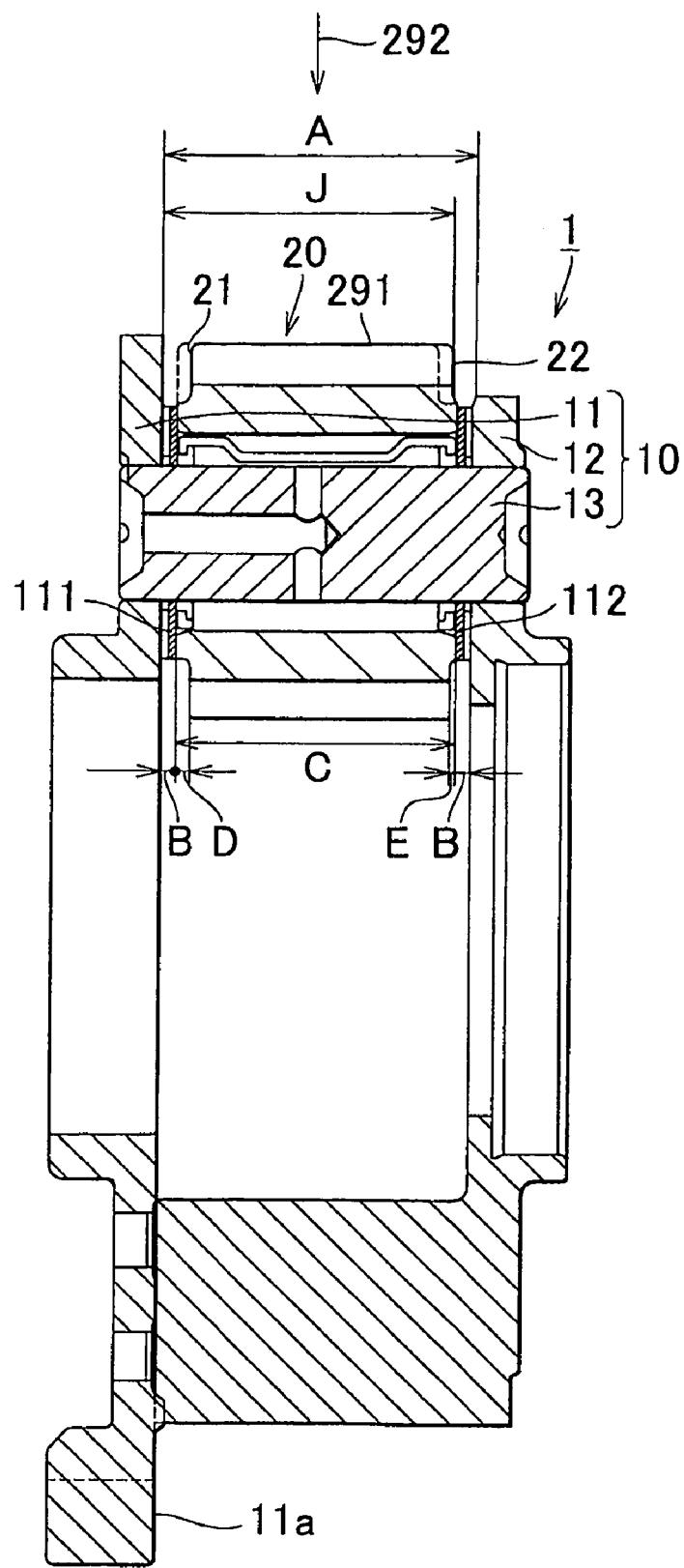
FIG. 11 illustrates the cross sectional view for describing a method for producing a planetary gear set according to a third embodiment of the invention.

Hereafter, a third embodiment of the invention will be described in detail. FIG. 11 illustrates the cross sectional view for describing the method for producing a planetary gear set according to the third embodiment. As shown in FIG. 11, according to the third embodiment, the distance between the second face 22 and a reference surface 11a is measured, and whether the pinion 20 is appropriately fitted to the planetary carrier 10 is determined by determining whether the measured value is within the predetermined range. If the pinion 20 is appropriately fitted to the planetary carrier 10, the measured value J is within the following range.

$$B+C-D<J\leq B+C-E$$

If the value J is not within the range, the pinion 20 is fitted to the planetary carrier 10 in the reverse orientation. After the pinion 20 is fitted to the planetary carrier 10, the distance between the second face 22 and the reference surface 11a is measured. Thus, shipment of a planetary gear set 1; where the pinion 20 is fitted to the planetary gear set 10 in the reverse orientation, can be prevented.

Namely, the method for producing a planetary gear set according to the third embodiment is the method for producing a planetary carrier provided with the same pinion as that in the first embodiment. The method includes fitting the pinion 20 to the planetary carrier 10, and determining whether the pinion 20 is fitted to the planetary carrier 10 in the reverse orientation by measuring the distance between the face of the tooth of the pinion 20 and the reference surface.

While the preferred embodiments of the invention have been described, the embodiments may be modified in various manners.

First, the invention may be applied not only to a transmission for a vehicle but also a transmission used for an element other than a vehicle.

Also, the planetary gear set according to the invention may be mounted not only in a vehicle but also in a two-wheeled vehicle.

As the profile of the tooth, an involute gear is described in the above-mentioned embodiment. However, the invention may be applied to a cycloidal gear or a circular arc gear.

The embodiment of the invention that has been disclosed in the specification is to be considered in all respects as illustrative and not restrictive. The technical scope of the invention is defined by claims, and all changes that come within the meaning and range of equivalency of the claims are therefore intended to be embraced therein.

The invention may be applied in a field of a planetary gear set that is mounted in, for example, a vehicle.

The invention claimed is:
1. A planetary gear set, comprising:
a sun gear;
pinions that are positioned around the sun gear and that mesh with the sun gear;
a planetary carrier that supports the pinions,
a ring gear that is positioned on an outer side of the pinions and that meshes with the pinions, and a reverse-fitting prevention device that prevents the pinions from being improperly fitted to the planetary gear set, wherein:

each pinion has a plurality of teeth on an outer surface, each tooth has a first tooth surface and a second tooth surface on opposite sides of the tooth, which can contact tooth surfaces of the sun gear and the ring gear, a deviation of the first tooth surface from a reference surface differs from a deviation of the second tooth surface from a reference surface, and the reverse-fitting prevention device includes a projection formed in the planetary carrier and formed at a position closer to the ring gear than the sun gear.

2. The planetary gear set according to claim 1, wherein the pinion has a first face and a second face on opposite sides of the pinion in a thrust direction, and a distance between the first face and a first face of the tooth differs from a distance between the second face and a second face of the tooth.

3. The planetary gear set according to claim 2, wherein the projection is formed on a face of the planetary carrier, which faces one of side surfaces of the tooth of the pinion.

4. The planetary gear set according to claim 1, wherein the tooth of the pinion is asymmetric.

5. The planetary gear set according to claim 4, wherein the projection is formed on a face of the planetary carrier, which faces one of side surfaces of the tooth of the pinion.

6. The planetary gear set according to claim 1, wherein the projection is formed on a face of the planetary carrier, which faces one of side surfaces of the tooth of the pinion.

\* \* \* \* \*